May 3, 1966  D. A. EISENHAUER  3,249,335
FISH NET LIFTING APPARATUS
Filed Oct. 28, 1964  2 Sheets-Sheet 1

Inventor
Daniel A. Eisenhauer
By Cushman, Darby & Cushman
Attorneys

United States Patent Office 3,249,335
Patented May 3, 1966

3,249,335
FISH NET LIFTING APPARATUS
Daniel Andrew Eisenhauer, Box 547, Lunenburg,
Nova Scotia, Canada
Filed Oct. 28, 1964, Ser. No. 406,993
5 Claims. (Cl. 254—138)

This invention relates to a fish net lifting apparatus of the type having a rotating head.

Known fish net hauling devices have been unsatisfactory in some respects in that they were complicated and, therefore, expensive to manufacture or if simple in construction, were unreliable and difficult to maintain in operation.

It is an object of this invention to provide a fish net lifting apparatus having a minimum of moving parts which is inexpensive to manufacture and which is dependable and easily maintained.

A further object is to provide a net lifting apparatus which grips the net securely thus avoiding slippage.

A further object is the provision of a net lifting apparatus, the head of which is readily adaptable for use with driving mechanisms commonly used in boats for lifting lobster traps and hauling trawl lines. These advantages may be gained and the disadvantages overcome through the use of the present invention.

The present invention provides a fish net lifting apparatus adapted to be mounted on a support having an axial bore therein and a rotatable drive shaft in the bore. The apparatus comprises a continuous arcuate cam of increasing thickness adapted to be fixed to the support, a rotatable head provided with a plurality of apertures therethrough adapted to be mounted on the drive shaft and to rotate therewith. A plurality of radial arms are provided on the rotatable head. The outer end of each arm co-operates with a selected peripheral portion of the rotatable head to form a peripheral gripper jaw. The inner end of each of the arms is pivotally connected to the rotatable head. Means associated with each of the arms are adapted to urge the associated jaw to a normally closed position. A rod associated with each of the arms extends through an associated aperture in the rotatable head. Each rod is adapted to ride with its lower end on the cam and to contact its associated arm with its upper end whereby on rotation of the rotatable head, the rod contacts the cam thereby raising the rod. The upper end of the rod raises the arm thereby opening the associated jaw against the urging of the means which normally urge the jaw to remain closed.

In the drawings which illustrate an embodiment of this invention,

Figure 1:
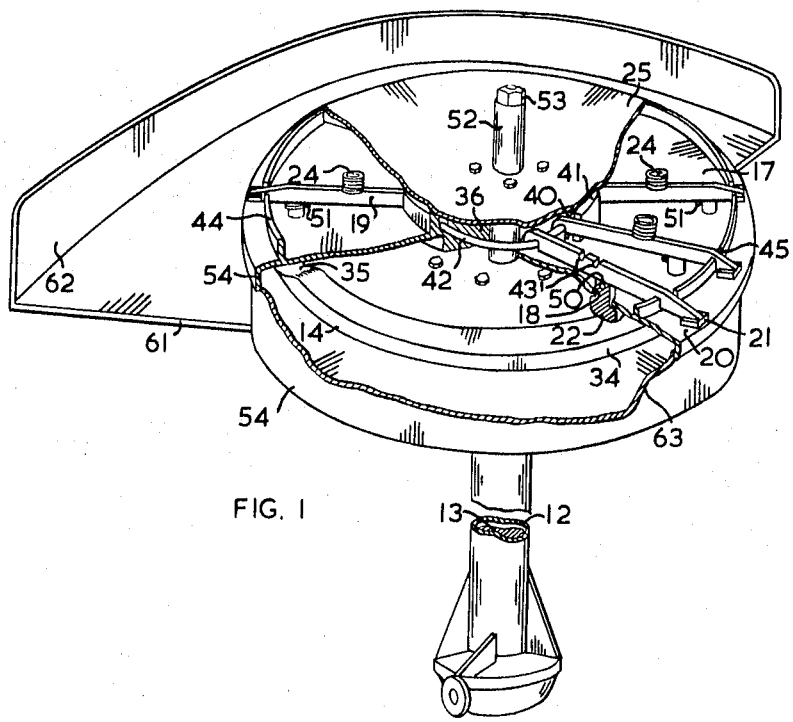
FIG. 1 is a perspective view partly in section of a net lifting apparatus constructed in accordance with this invention.
Figure 2:
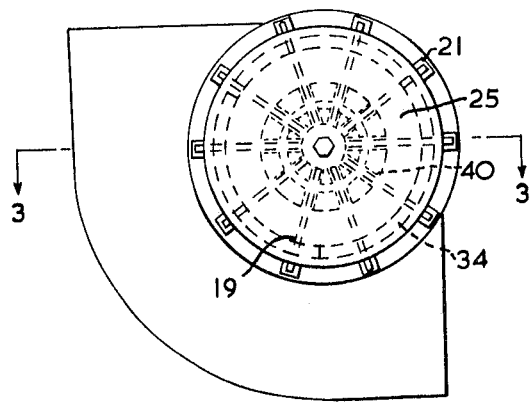
FIG. 2 is a plan view of the net lifting device of FIG. 1.

Referring now in detail to the drawings, a gill net lifter is shown generally at 10 in FIG. 1 on a support 11 having an axial bore 12 and a rotatable drive shaft 13 in the bore 12.

The net lifter 10 includes generally a stationary head 14 secured to the support 11 and a continuous arcuate cam 15 integral with the head 14. A rotatable head 17 having a plurality of apertures 18 is adapted to be mounted on the drive shaft 13 and to rotate therewith. A plurality of radial arms 19 on the rotatable head 17 co-operate with peripheral portions 20 of the head 17 to form gripper jaws. The outer ends of the arm 19 are provided with gripper pads 21 while the inner ends thereof are pivotally connected to the rotatable head 17. Push rods 22, one of which is associated with each of the radial arms 19, extend through the apertures 18 in the rotatable head. The lower ends 23 of the rods 22 contact the cam 15. A spring retaining cover 25 having a centrally located aperture 26 is secured to the rotatable head 17. Helical springs 24, one of which is associated with each of the arms 19, are provided between the arms 19 and the spring retaining cover 25.

Figure 3:
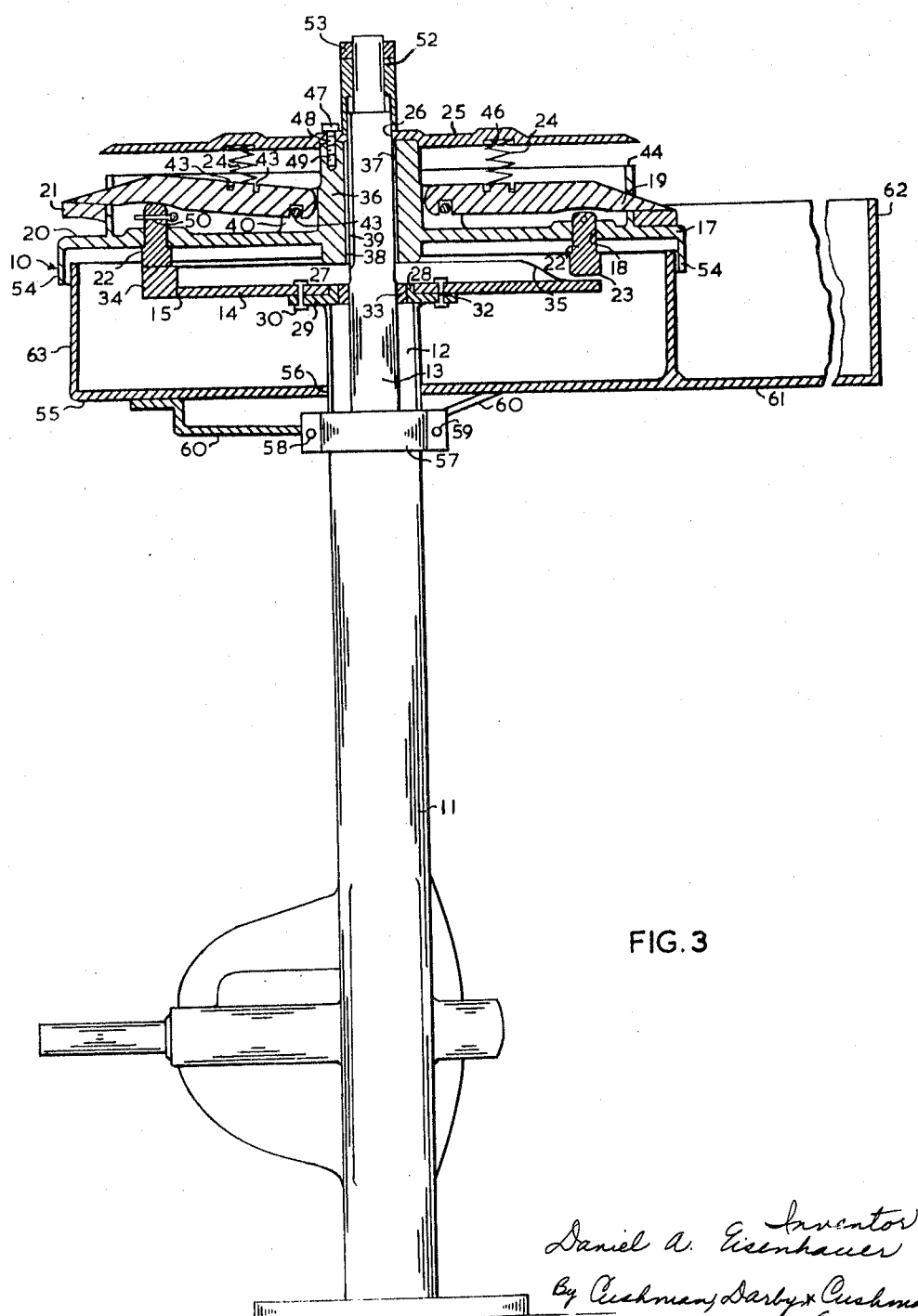
FIG. 3 is a sectional view taken along the line 3—3 of FIG. 2.

The stationary head 14, as shown more clearly in FIG. 3 is in the form of a circular steel plate having a centrally located aperture 27. A collar 28 adapted to be inserted in the aperture 27 of the plate, is provided with a laterally projecting annular flange 29, having apertures 30 therein co-operating with apertures 31 in the head 14. The collar 28 surrounds the drive shaft 13 and is secured to the end of the support 11 by welding or other suitable means.

A concentric annular bearing 33 is provided in the collar 28 between the shaft 13 and the collar 28.

The continuous arcuate cam 15 may be integral with the stationary head 14 and is shown as being of increasing thickness to provide a raised portion 34 extending through approximately 120° and having tapered ends 35.

The rotatable head 17 is a circular plate which has a centrally located hub 36. A bore 37 in the hub 36 is provided with a keyway 38 to receive a key (not shown) which co-operates with a similar keyway 39 in the drive shaft 13.

The hub 36 is provided with radial slots 40 to receive the radial arms 19. An annular groove 41 communicating with the slots 40 is provided in the hub 36 to receive an annular ring 42 of circular cross section. The ring 42 co-operates with a notch 43 in the underside of the arm 19 adjacent the inner end thereof to mount the arm 19 pivotally on the rotatable head 17.

An integral upwardly projecting rim 44 spaced from the periphery of the head 17 is provided with notches 45 to receive the portion of one of the arms adjacent the gripper pad 21. A downwardly projecting rim 54 is provided at the periphery of the rotatable head 17.

Each of the push rods 22 is provided with a transverse hole 50 adjacent its upper end to receive a cotter pin 51 or similar retaining element. The cotter pin 51 limits downward movement of the push rod 22 thereby retaining the push rod on the rotatable head 17.

A pair of spaced transverse notches 43 are provided in each arm 19 to receive the lower end of the associated helical compression spring 24.

The spring retaining cover 25 is provided with a plurality of circular indentations 46 to receive the upper end of an associated spring 24. The cover 25 is secured on the hub 36 by any convenient means such as bolts 47 extending through suitable apertures 48 and threadedly received in tapped holes 49 in the hub 36. It is also feasible to employ a helical spring, one end of which is secured to the arm 19, the other end being secured to the rotatable head 17.

A tubular spacer element 52 surrounding the end portion of the drive shaft 13, bears against the upper surface of the spring retaining cover 25. An adjustment nut 53 threadedly received on the end of the shaft 13 bears against the adjacent end of the spacer element 52.

A dish shaped guard 55 has vertical walls 63 and a centrally located aperture 56 in the bottom thereof to receive the support 11, so that the upper edges of the side walls 63 are adjacent the downwardly projecting rim 54 of the rotatable head. A conventional clamp 57 is secured to the support 11 by bolts 58 and 59. Three radial lateral extensions 60 are secured at their inner ends to the clamp 57 and at their outer ends to the guard 55 to maintain the guard in position on the support 11.

A net guide or tray 61 having a vertical outer wall 62 is welded at its inner edge to the cylindrical wall 63 of the guard 55.

In operation, the net lifter 10 is installed on a suitable support 11 (such as an automobile axle and differential particularly modified for such purpose) and rotary force supplied to the drive shaft 13, causing the rotatable head 17 to rotate. This rotation of the head 17 causes push rods 22, not already in contact with the raised portion 34 of the cam 15, to move to engage the tapered end 35 of the cam 15 and be raised thereby. Upward movement of the push rod 22 in this manner causes pivotal upward movement of the associated arm 19 thereby opening the associated normally closed jaw formed between gripper pad 21 and the associated peripheral portion 20 of the rotatable head. The associated spring 24 is compressed by this upward movement of the arm 19.

When the head 17 and the associated push rod 22 rotate until the rod 22 is no longer in contact with the raised portion 34 of the cam 15 (approximately 120°) the pressure of spring 24 urges the arm 19 to pivot downwardly thus lowering pad 21 onto the associated peripheral portion 20 of the rotatable head 17 to close the jaw formed thereby.

Ropes or lines (not shown) associated with fishing gear to be lifted are placed under the gripper pads 21 at the point where the jaw is held open by the action of the cam 15 on the push rods. Further rotation of the head 17 causes the pad 21 to be lowered due to the action of spring 24. The rope is thus gripped by the pad and moved through approximately 60° before being released by the action of the cam 15 on the push rod 22 and radial arm 19 as the push rod 22 again contacts the raised portion 34 of the cam.

This gripping and releasing action as the head 17 rotates causes the nets or lines being lifted to be moved around the lifter 10 while being guided by the tray 61 and be deposited within a fishing boat upon which the device may be installed.

It is understood that modifications which will occur to those skilled in the art such as the provision of resilient members of rubber in place of the springs to urge the arms toward the rotatable head are within the scope of the invention as defined in the appended claims.

I claim:

1. In a fish net lifting apparatus adapted to be mounted on a support, said support having an axial bore therein and a rotatable drive shaft in said bore, said apparatus comprising,
    (a) a continuous arcuate cam of increasing height adapted to be fixed to said support,
    (b) a rotatable head provided with a plurality of apertures therethrough and adapted to be mounted on said drive shaft and adapted to rotate therewith,
    (c) a plurality of radial arms on said rotatable head,
        (i) the outer end of each said arm co-operating with a selected peripheral portion of said rotatable head to form a peripheral gripper jaw,
        (ii) the inner end of each said arm being pivotally connected to said rotatable head;
    (d) means co-operating with each said arm adapted to urge an associated said jaw to a normally closed position; and
    (e) a rod, co-operating with each said arm and extending through an adjacent one of said apertures in said rotatable head, each said rod being adapted
        (i) to ride with its lower end on said cam, and
        (ii) to contact its associated said arm with its upper end whereby on rotation of said rotatable head,
            (i) said rod contacts said cam thereby raising said rod, and
            (ii) the upper end of said rod raises said arms thereby opening an associated said jaw against the urging of said means.

2. In a fish net lifting apparatus adapted to be mounted on a support, said support having an axial bore therein and a rotatable drive shaft, in said bore, said apparatus comprising,
    (a) a continuous arcuate cam of increasing height adapted to be fixed to said support,
    (b) a rotatable head provided with a plurality of apertures therethrough and adapted to be mounted on said drive shaft and adapted to rotate therewith,
    (c) a plurality of radial arms on said rotatable head,
        (i) the outer end of each said arm co-operating with a selected peripheral portion of said rotatable head to form a peripheral gripper jaw,
        (ii) the inner end of each said arm being pivotally connected to said rotatable head;
    (d) a helical compression spring co-operating with each said arm adapted to urge an associated said jaw to a normally closed position;
    (e) a spring retaining element on said rotatable head to retain said springs in contact with said arms, and
    (f) a rod, co-operating with each said arm, and extending through an adjacent one of said apertures in said rotatable head, each said rod being adapted,
        (i) to ride with its lower end on said cam, and
        (ii) to contact its associated said arm with its upper end whereby on rotation of said rotatable head,
            (i) said rod contacts said cam thereby raising said rod, and
            (ii) the upper end of said rod raises said arms thereby opening an associated said jaw against the urging of said spring.

3. In a fish net lifting apparatus adapted to be mounted on a support, said support having an axial bore therein and a rotatable drive shaft in said bore, said apparatus comprising,
    (a) a continuous arcuate cam of increasing height adapted to be fixed to said support,
    (b) a rotatable head including a central hub, said head being provided with a plurality of apertures therethrough and adapted to be mounted on said drive shaft and adapted to rotate therewith, said hub being provided with a plurality of radial slots therein and a concentric annular groove communicating with said slots,
    (c) a ring in said annular groove,
    (d) a plurality of radial arms on said rotatable head,
        (i) the outer end of each said arm co-operating with a selected peripheral portion of said rotatable head to form a peripheral gripper jaw,
        (ii) the inner end of said arm being received in a selected one of said radial slots in said hub,
        (iii) said inner end of each said arm having a notch to receive and pivotally to connect said arm to said rotatable head;
    (e) a helical spring co-operating with each said arm adapted to urge an associated said jaw to a normally closed position; and
    (f) a rod, co-operating with each said arm, and extending through an adjacent one of said apertures in said rotatable head, each said rod being adapted,
        (i) to ride with its lower end on said cam, and
        (ii) to contact its associated said arm with its upper end whereby on rotation of said rotatable head,
            (i) said rod contacts said cam thereby raising said rod, and
            (ii) the upper end of said rod raises said arms thereby opening an associated said jaw against the urging of said helical spring.

4. In a fish net lifting apparatus adapted to be mounted on a support, said support having an axial bore therein and a rotatable drive shaft in said bore, said apparatus comprising,
- (a) a continuous arcuate cam of increasing height adapted to be fixed to said support,
- (b) a rotatable head including a central hub, said head being provided with a plurality of apertures therethrough and adapted to be mounted on said drive shaft and adapted to rotate therewith, said hub being provided with a plurality of radial slots therein and a concentric annular groove communicating with said slots,
- (c) a ring in said annular groove,
- (d) a plurality of radial arms on said rotatable head,
  - (i) the outer end of each said arm co-operating with a selected peripheral portion of said rotatable head to form a peripheral gripper jaw,
  - (ii) the inner end of said arm being received in a selected one of said radial slots in said hub,
  - (iii) said inner end of each said arm having a notch to receive and pivotally to connect said arm to said rotatable head;
- (e) a helical spring co-operating with each said arm adapted to urge an associated said jaw to a normally closed position;
- (f) a spring retaining element comprising a disc mounted concentrically on said hub to retain said springs in contact with said arms; and
- (g) a rod, co-operating with each said arm, and extending through an adjacent one of said apertures in said rotatable head, each said rod being adapted,
  - (i) to ride with its lower end on said cam, and
  - (ii) to contact its associated said arm with its upper end whereby on rotation of said rotatable head,
    - (i) said rod contacts said cam thereby raising said rod, and
    - (ii) the upper end of said rod raises said arms thereby opening an associated said jaw against the urging of said helical spring;

5. In a fish net lifting apparatus adapted to be mounted on a support, said support having an axial bore therein and a rotatable drive shaft in said bore, said apparatus comprising,
- (a) stationary head comprising a circular plate fixed to said support, said plate including a centrally located aperture therein through which said drive shaft is adapted to extend,
- (b) a continuous arcuate cam of increasing height integral with said circular plate on the surface thereof,
- (c) a rotatable head including a central hub, said head being provided with a plurality of apertures therethrough and adapted to be mounted on said drive shaft and adapted to rotate therewith, said hub being provided with a plurality of radial slots therein and a concentric annular groove communicating with said slots,
- (d) a ring in said annular groove,
- (e) a plurality of radial arms on said rotatable head,
  - (i) the outer end of each said arm co-operating with a selected peripheral portion of said rotatable head to form a peripheral gripper jaw,
  - (ii) the inner end of said arm being received in a selected one of said radial slots in said hub,
  - (iii) said inner end of each said arm having a notch to receive and pivotally to connect said arm to said rotatable head;
- (f) a helical spring co-operating with each said arm adapted to urge an associated said jaw to a normally closed position; and
- (g) a rod, co-operating with each said arm, and extending through an adjacent one of said apertures in said rotatable head, each said rod being adapted,
  - (i) to ride with its lower end on said cam, and
  - (ii) to contact its associated said arm with its upper end whereby on rotation of said rotatable head,
    - (i) said rod contacts said cam thereby raising said rod, and
    - (ii) the upper end of said rod raises said arms thereby opening an associated said jaw against the urging of said helical spring.

References Cited by the Examiner

UNITED STATES PATENTS

| | | | |
|---|---|---|---|
| 812,677 | 2/1906 | Paulson | 74—230.24 |
| 980,650 | 1/1911 | Madlehner | 254—138 |
| 1,002,762 | 9/1911 | Saunders et al. | 254—138 |
| 1,054,025 | 2/1913 | Paulsen | 74—230.24 |

EVON C. BLUNK, *Primary Examiner.*

ANDRES H. NIELSEN, *Assistant Examiner.*